United States Patent [19]
Hutchins

[11] Patent Number: 5,513,464
[45] Date of Patent: May 7, 1996

[54] SPRING TRAP FISHING TACKLE

[76] Inventor: Paul R. Hutchins, 103 Spencer Rd., Washington Crossing, Pa. 18977

[21] Appl. No.: 337,727

[22] Filed: Nov. 14, 1994

[51] Int. Cl.[6] .................................................. A01K 83/00
[52] U.S. Cl. .................................................. 43/34; 43/35
[58] Field of Search .................................. 43/34, 35, 37, 43/81, 89

[56] References Cited

U.S. PATENT DOCUMENTS

| | | | |
|---|---|---|---|
| 839,611 | 12/1906 | Martin | 43/34 |
| 2,149,923 | 3/1939 | Martin | 43/34 |
| 2,162,241 | 6/1939 | Boyce | 43/89 |
| 2,179,597 | 11/1939 | Palsson | 43/34 |
| 2,717,467 | 9/1955 | Godon | 43/35 |
| 2,718,090 | 9/1955 | Messer | 43/89 |
| 2,897,628 | 8/1959 | Thibodeau | 43/89 |
| 4,669,215 | 6/1987 | Ringuette | 43/34 |

FOREIGN PATENT DOCUMENTS

| | | | |
|---|---|---|---|
| 7708 | of 1908 | United Kingdom | 43/89 |

Primary Examiner—Richard K. Seidel
Assistant Examiner—Jeanne M. Elpel
Attorney, Agent, or Firm—Stephen D. Carver; Trent C. Keisling

[57] ABSTRACT

An active fishing lure that impales a fish in response to an initial fish strike. The disclosed tackle comprises an elongated, durable stainless steel or resilient plastic casing that may be externally disguised as bait. The casing houses a trigger, a compression spring and a torsion spring. The casing also partially houses the secondary hook when it is cocked. The secondary hook rotates between a cocked position and a triggered position. The primary hook is attached to the trigger. The trigger temporarily secures the secondary hook in the cocked position with a projecting tang. The secondary hook is released by a fish strike upon the primary hook. When the trailing primary hook is attacked by a fish the trigger is displaced linearly within the casing to unleash the active or secondary hook. The torsion spring forcefully rotates the secondary hook toward a triggered position where it impales the fish. In this position, the disclosed device prevents the escape of the fish. The torsion spring may be disconnected from the secondary hook to disarm the device.

19 Claims, 3 Drawing Sheets

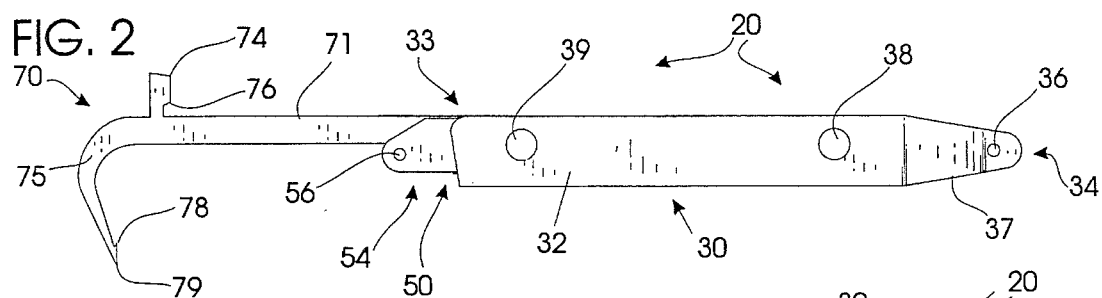
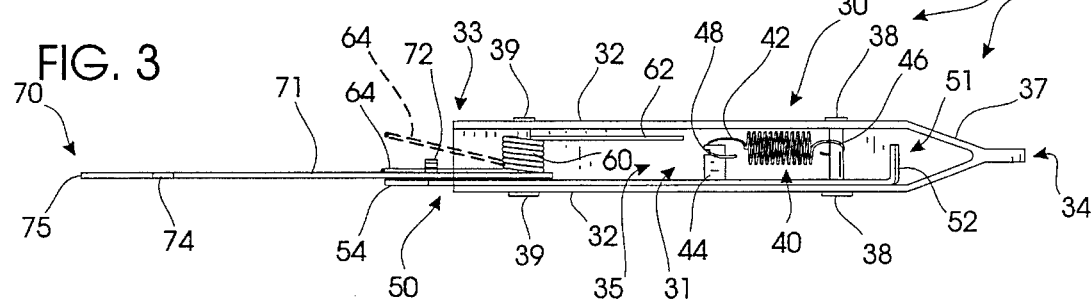
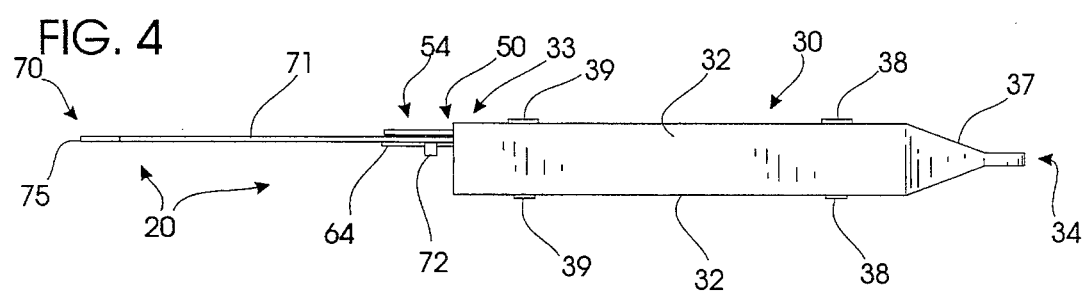
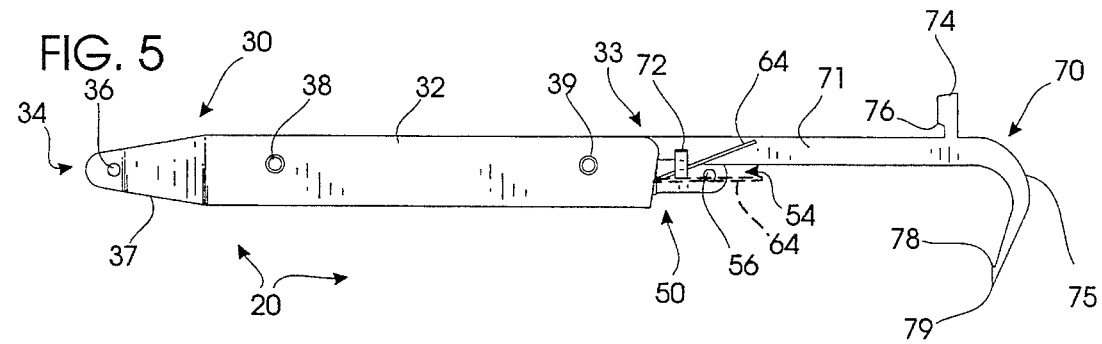
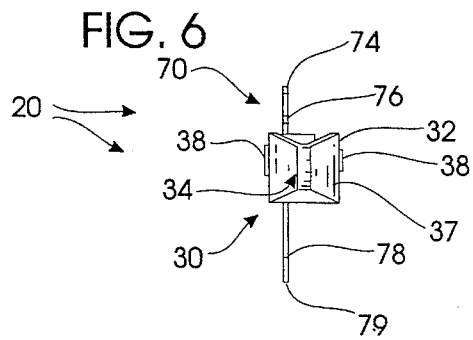
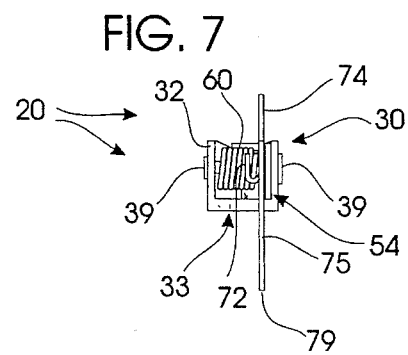

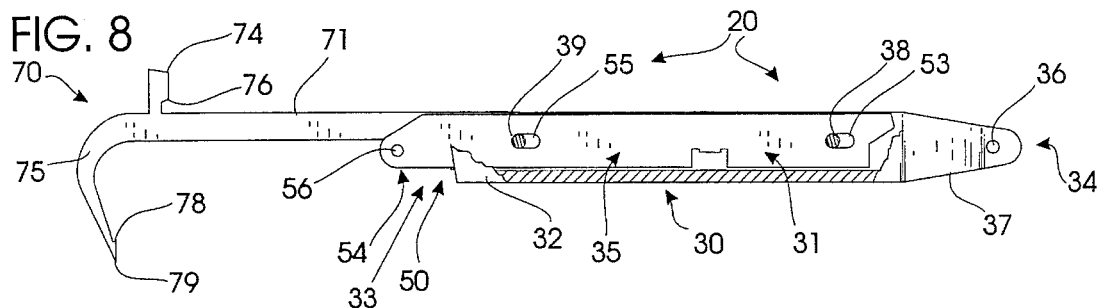
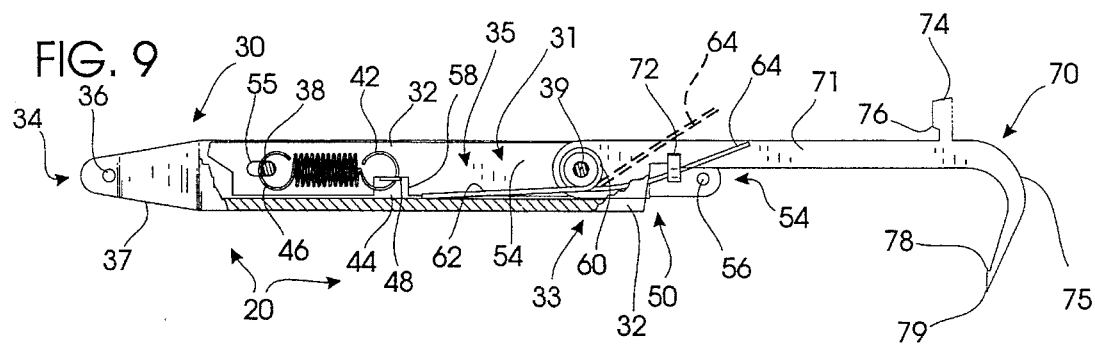
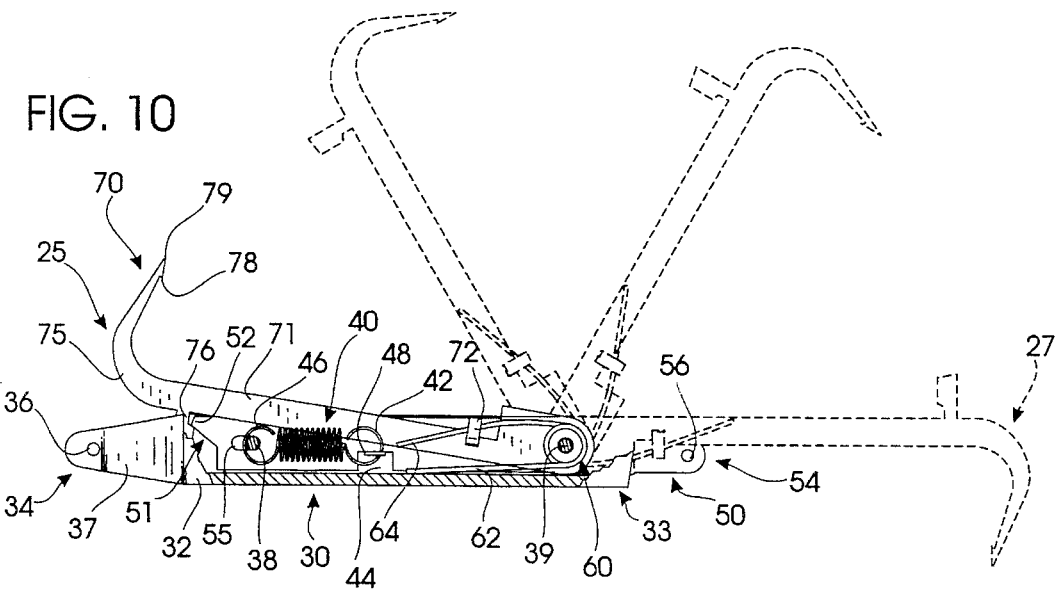

SPRING TRAP FISHING TACKLE

BACKGROUND OF THE INVENTION

I. Field of the Invention

The invention generally relates to fishing tackle. More particularly, the instant invention relates to a spring loaded trap that impales a fish after a conventional hook is set. Relevant, known prior art can be found in U.S. Class 43, subclasses 34, 35, 37 and 89.

II. Description of the Prior Art

As will be recognized by those skilled in the art, most fishing lures or tackle have a passive hook system that must be attacked by the fish before the angler can set his hook and land his prey. Where live bait is used, a single hook is often employed in conjunction with a leader, swivel and the like. Where artificial baits are employed, several treble hooks may be associated with the lure, but all are "passive" in that they do not in and of themselves attack the fish. A major problem associated with single hook lures is the loss of fish as a result of the straightening of the hook or simply the failure of the hook to set properly. Any time an angler loses a fish that he thought he had hooked, it is extremely frustrating. Several prior art devices have attempted to overcome this problem by utilizing "active" hooks or hooking mechanisms that vigorously attack the fish only after the fish makes a first strike.

Known active hooking systems normally involve a spring trap having a second hook that impales the fish after it strikes. U.S. Pat. Nos. 2,718,090, 2,897,628, 839,611, 2,162,241 and 4,669,215 are all examples of fish hooking devices involving secondary spring-activated hooks. These devices employ one or more hooks to impale a fish after a primary, bait carrying hook is first taken by the tempted fish. However, the majority of these devices do not provide a housing for the trap components. Thus, a common problem associated with the use of these prior art devices is the entanglement of the exposed spring. Generally, the spring becomes entangled with material on the bottom of the lake or pond. The spring may also become entangled with other obstructions that prevents its proper operation.

U.S. Pat. No. 2,162,241 provides a cylindrical casing for housing the spring. However, with the cocking mechanism thereshown it can be difficult for the user to manipulate the device. The spring must be compressed by hand and the secondary hooks set while the user holds the spring closed manually.

The known prior art fails to provide a fish hooking device that houses the activating spring in a protective casing while providing a simple method of setting the hook. Another problem with the prior art is that "active" fish hooking devices are difficult to cock or "arm." Another problem with the prior art is that "active" fish hooking devices are difficult to disarm. Yet another problem in the prior art is that known active hooking mechanisms are difficult to disguise as bait. Thus, it is desirous to provide a secondary fish hooking device that protects the activating spring while providing a safe and effective hooking arrangement and a desirable outer appearance.

SUMMARY OF THE INVENTION

I have designed an active fish hooking device that houses the activating spring inside a protective casing or housing. My fish hooking apparatus is designed to be easily user manipulated and to safely impale the fish quickly and efficiently. My trap is also disguiseable as bait.

My fish hooking apparatus comprises a elongated, durable stainless steel or a resilient plastic casing that houses most of the components. The casing houses a trigger, a compression spring and a torsion spring. The casing also partially houses the secondary hook when it is cocked. The secondary hook rotates between a cocked position and a triggered position. The primary hook is attached to the trigger. The secondary hook may be disarmed by removing the spring arm from the secondary hook. The trigger temporarily secures the secondary hook in the cocked position.

The secondary hook is released by a fish strike upon the primary hook. When the trailing primary hook is attacked by a fish the trigger is displaced linearly within the casing to unleash the active or secondary hook. The torsion spring forcefully rotates the secondary hook toward a triggered position where it impales the fish. In this position, my fishing device prevents the escape of the fish.

Thus a primary object of my invention is to provide a highly reliable active fishing system.

Another object is to provide an active fish hooking apparatus wherein most of the components are disposed within a protective casing.

A primary object is to provide an active fish hooking apparatus that may be disguised within a conventional lure body.

Another object is to provide an active fish hooking apparatus that is compactly housed within a streamlined casing.

Another basic object of the invention is to provide a trap with the exterior appearance of bait.

A basic object of the present invention is to provide a safe and effective secondary fish hooking device that may be disarmed.

Another basic object of the present invention is to provide a fish hooking device that is easily cocked.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 2 is a side elevational view of the casing, with the secondary hook deployed in the triggered position;

FIG. 3 is a top plan view, and wherein dashed lines show moved positions;

FIG. 4 is a bottom plan view;

FIG. 5 is an elevational view showing the side opposite from that illustrated in FIG. 2;

FIG. 6 is a front plan view;

FIG. 7 is a rear plan view;

FIG. 8 is a partially fragmented side view similar to FIG. 2, with portions omitted for clarity;

FIG. 9 is a partially fragmented view similar to FIG. 5, with portions omitted for clarity, and wherein dashed lines show moved positions; and, FIG. 10 is a partially fragmented view similar to FIG. 9, with portions omitted for clarity, and wherein dashed lines show moved positions.

DETAILED DESCRIPTION

Figure 1:
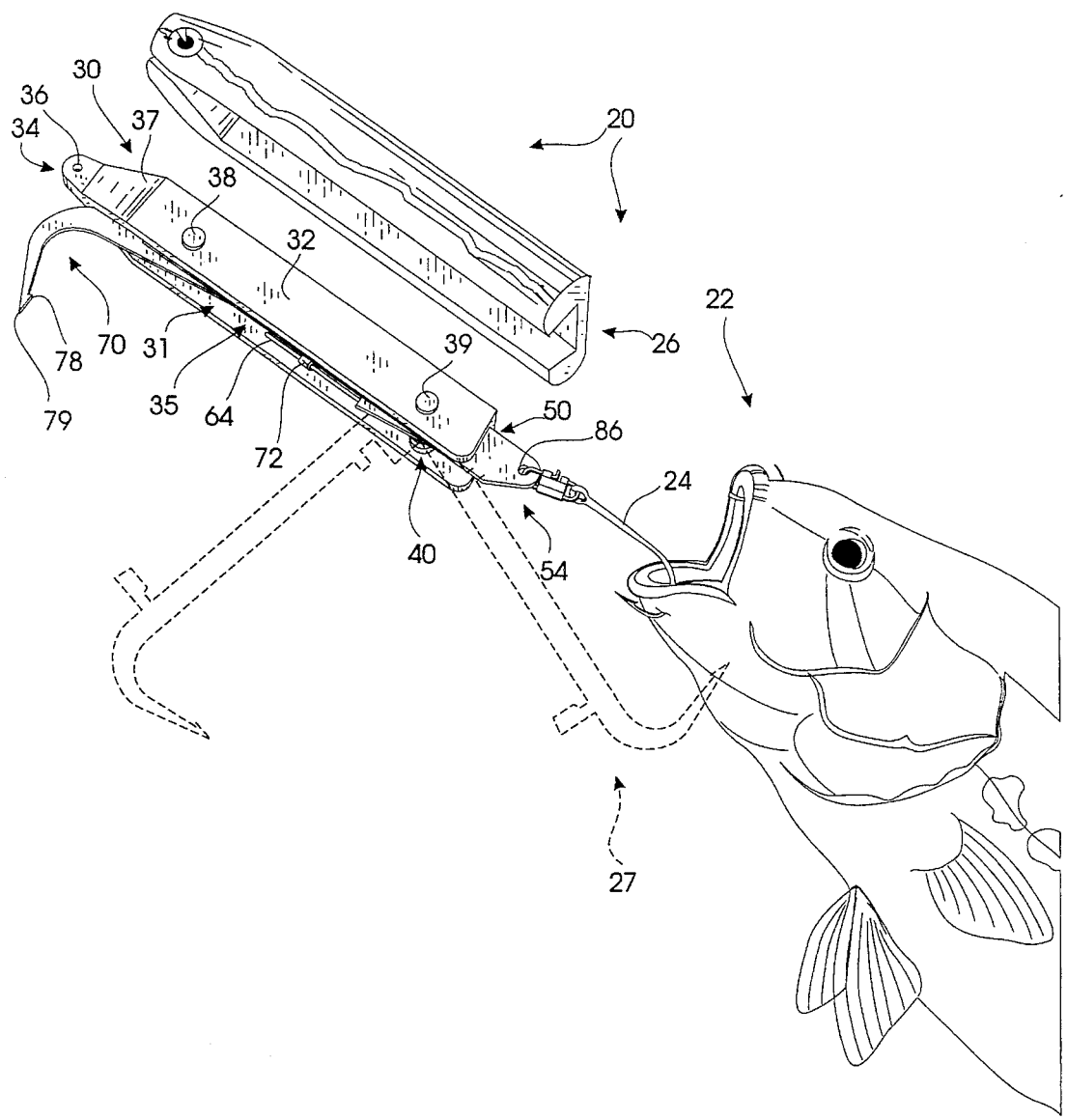
FIG. 1 is a fragmentary, partially exploded pictorial view showing the best mode of my Spring Trap Fishing Tackle in use, with an optional lure body exploded from the trap casing, and moved positions indicated in dashed lines.

Referring more specifically to the drawings, my improved Spring Trap Fishing Tackle has been generally designated by the reference numeral 20. The tackle 20 initially hooks a fish 22 like most conventional lures (FIG. 1) when a fish 22 strikes a primary hook 24. The primary hook 24 is attached to a trigger 50. The trigger 50 latches a secondary hook 70 in a cocked position 25. When the fish axially rearwardly pulls primary hook 24, the trigger 50 releases the secondary hook 70. A torsion spring 60 forcefully rotates the secondary hook outwardly and downwardly to a triggered position 27 (shown by the dashed lines in FIG. 1). When the secondary hook 70 reaches the triggered position 27, it impales fish 22 to prevent subsequent escape.

An optional outer body 26 snap fits to the casing 30 to make the tackle look like a conventional lure or to disguise the tackle as bait. However, the outer body 26 is not required for my invention to function properly.

The tackle 20 is principally comprised of an elongated protective casing 30 that houses several of the components of the trap. The casing houses a trigger 50, a tension spring 40 and a torsion spring 60. A secondary hook 70 is temporarily, partially housed in the casing 30 when in the cocked position 25.

The casing 30 has an open face or slot 31 that is defined between a pair of parallel spaced apart walls 32. The slot 31 extends substantially along one face of the casing 30 for its entire length from a trailing end 33 to a leading end 34 (FIG. 3). Although the slot 31 is shown as an entire open wall of the casing that exposes the casing interior 35, this is not required. The slot 31 simply needs to permit the secondary hook 70 to move between the cocked and triggered positions. In other words, the slot 31 could be as narrow as the secondary hook width and still perform successfully.

The casing sides 32 angle inwardly at shoulders 37, merging to form the leading end 34. An eyelet 36 penetrates the leading end 34 for attaching the tackle 20 to a fishing line or such. A pair of spaced apart pop rivets function as axles 38, 39. The axles 38, 39 penetrate the casing 30 close to the ends 33, 34 and extend perpendicularly between the sides.

The tension spring 40 biases the trigger 50 toward the leading end 34 and into the cocked position 25. A loop 42 wraps around a trigger tab 44 defined in the trigger. A notch 48 in the trigger tab 44 secures the loop 42. Another loop 46 wraps around the upper axle 38 to cooperatively retain the spring 40 in place.

The trigger 50 extends longitudinally from the casing shoulders 37 past the trailing end 33. The trigger is substantially coplanar with the casing walls 32 and the trigger is housed substantially inside the casing interior. A tang 52 is formed at the trigger internal end or latch end 51. An orifice 56 penetrates the trigger near its external end or hook attachment end 54 to facilitate the attachment of the primary hook 24. A pair of ellipsoidal orifices or follower slots 55, 53 are defined in the trigger 50. The axles 38, 39 penetrate these follower slots 55, 53 to captivate the trigger within the casing 30. The follower slots 55, 53 permit the longitudinal axial movement of the trigger. Preferably, the trigger tab 44 is formed by bending or deforming a portion 58 of the trigger.

A torsion spring 60 is wound around the lower axle 39 to provide a biasing force for the secondary hook 70. An internal leg 62 is captivated within the casing interior to anchor the torsion spring 60. Another leg 64 is captivated by hook clip 72. As shown by the dashed lines in FIGS. 3 and 9, the leg 64 may be removed from hook clip 72 to disarm the secondary hook to prevent unintentional cocking or for storage. The rotation and corresponding torsional compression of the torsion spring 60 when the hook is rotated to the cocked position stores the biasing force necessary to impale the fish.

The secondary hook 70 rotates about the lower axle 39 between the retracted or cocked position 25 (as shown in FIGS. 1 and 10) and a deployed or triggered position 27 (as shown by the dashed lines). The secondary hook 70 comprises an elongated linear body 71 having a curved end 75. A keeper or latch 74 projects from the body 71 near the curved end 75. The latch 74 has a notch 76 that engages the trigger tang 52 to cock the hook. The end 75 terminates in a barbed end 78 having a penetrating point 79.

As can most clearly be seen in FIGS. 1 and 10, the hook 70 rotates from a cocked position 25 to an engaged position 27 to impale a fish 22. My device works by releasing the secondary hook 70 when a fish strikes the primary hook 24. The axial movement of the trigger outwardly releases the keeper or latch 74 and the hook forcefully rotates from the cocked position to the triggered position. The end result, an impaled fish as shown in FIG. 1, prevents a subsequent escape as a result of hook failure or improper setting of the hook.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. Active fishing tackle comprising:

an elongated casing having a leading end adapted to be attached to a fishing line and a spaced apart trailing end;

a primary hook;

a secondary hook rotatably pivoted to said casing and displaceable between a retracted position and a triggered position where it impales a fish;

an elongated, longitudinally displaceable trigger, said trigger having an external end extending from said casing for attachment to said primary hook, and a remote end;

means for yieldably biasing said trigger towards said casing leading end;

tang means projecting from said trigger remote end for engaging said secondary hook to lock it in said retracted position; and, spring means for forcibly activating said secondary hook when said secondary hook is released from said tang means.

2. The active fishing tackle as defined in claim 1 wherein:

said casing comprises a pair of generally planar, spaced apart sides and a pair of spaced apart axles extending between said sides; and, said trigger comprises a pair of spaced apart, follower slots penetrated by said axles that enable longitudinal displacement of said trigger.

3. The active fishing tackle as defined in claim 2 wherein said trigger comprises a tab between said slots and said means for biasing said trigger towards said casing leading end comprises a spring extending from one of said axles to said tab.

4. The active fishing tackle as defined in claim 3 wherein said secondary hook comprises a latch releasably engaged by said tang means.

5. The active fishing tackle as defined in claim 3 wherein said spring means for forcibly activating said secondary hook comprises a torsion spring captivated upon one of said axles, said torsion spring having a leg secured to said secondary hook.

6. The active fishing tackle as defined in claim 5 wherein said torsion spring may be detached from said secondary hook.

7. An active fishing lure comprising:

an elongated body disguised as bait and adapted to be attached to a fishing line;

an elongated trap disposed within said body, said trap having a leading end and a trailing end;

a primary hook trailing from said lure;

a secondary hook rotatably pivoted within said trap and displaceable between a set position and a triggered position where it exteriorly impales a fish;

an elongated, longitudinally displaceable trigger having an external end for attachment to said primary hook and a remote end;

means for yieldably biasing said trigger towards said trap leading end;

tang means projecting from said trigger remote end for engaging said secondary hook to lock it in said set position; and, spring means for forcibly activating said secondary hook when released from said tang means.

8. The active fishing lure as defined in claim 7 wherein:

said trap comprises a pair of generally planar, spaced apart sides and a pair of spaced apart axles extending between said sides; and, said trigger comprises a pair of spaced apart, follower slots penetrated by said axles that enable longitudinal displacement of said trigger.

9. The active fishing lure as defined in claim 8 wherein said trigger comprises a tab between said slots and said means for biasing said trigger towards said trap leading end comprises a spring extending from one of said axles to said tab.

10. The active fishing lure as defined in claim 9 wherein said secondary hook comprises a latch releasably engaged by said tang means when said secondary hook is set.

11. The active fishing tackle as defined in claim 9 wherein said spring means for forcibly activating said secondary hook comprises a torsion spring captivated upon one of said axles, said torsion spring having a leg secured to said secondary hook.

12. The active fishing tackle as defined in claim 11 wherein said torsion spring may be detached from said secondary hook.

13. An active fishing device comprising:

an elongated, hollow casing having a leading end attached to a fishing line, a spaced apart trailing end, and an interior;

a primary hook;

a secondary hook rotatably pivoted to said casing and displaceable between a cocked position at least partially nested within said interior and a triggered position where it impales a fish;

an elongated, longitudinally displaceable trigger disposed within said interior, said trigger having an external end extending from said casing trailing end for attachment to said primary hook, and a remote internal end;

compression spring means for yieldably biasing said trigger towards said casing leading end;

tang means projecting from said trigger internal end for cocking said secondary hook; and, torsion spring means for forcibly activating said secondary hook when released from said tang means in response to a strike on said primary hook.

14. The active fishing device as defined in claim 13 wherein:

said casing comprises a pair of generally planar, spaced apart sides, a slot permitting escape of said secondary hook, and a pair of spaced apart axles extending between said sides; and, said trigger comprises a pair of spaced apart, follower slots penetrated by said axles that enable longitudinal displacement of said trigger.

15. The active fishing device as defined in claim 14 wherein said trigger comprises a tab between said slots and said compression spring means extends from one of said axles to said tab.

16. The active fishing device as defined in claim 14 wherein said secondary hook comprises a notched keeper releasably engaged by said tang means when said secondary hook is cocked.

17. The active fishing tackle as defined in claim 14 wherein said spring means for forcibly activating said secondary hook comprises a torsion spring captivated upon one of said axles, said torsion spring having a leg secured to said secondary hook.

18. The active fishing tackle as defined in claim 14 wherein said torsion spring may be detached from said secondary hook.

19. The active fishing device as defined in claim 14 including an elongated body disguised as bait adapted to receive said casing.

* * * * *